United States Patent [19]

Moerman

[11] Patent Number: 4,888,448

[45] Date of Patent: Dec. 19, 1989

[54] TEMPORARY ELECTRICAL POWER PEDESTAL

[76] Inventor: Paul G. Moerman, P.O. Box 3053, San Luis Obispo, Calif. 93403

[21] Appl. No.: 367,147

[22] Filed: Jun. 16, 1989

[51] Int. Cl.$^4$ .......................... H02G 9/00; H02B 9/00
[52] U.S. Cl. ....................................... 174/38; 361/365
[58] Field of Search ................... 174/37, 38; 361/331, 361/332, 334, 364, 365; 52/19, 20, 21, 27; 137/356, 363, 364, 371; 220/18, 287; 312/100

[56] References Cited

U.S. PATENT DOCUMENTS 1,617,626   2/1927   FitzGerald ............................. 52/27

*Primary Examiner*—Laramie E. Askin
*Attorney, Agent, or Firm*—Daniel C. McKown

[57] ABSTRACT

A temporary electrical power pedestal for use at construction sites is molded of plastic as a unitary article and includes a hollow column that extends upwardly from a base. A rectangular wall depends from the base and serves as a plug which can be inserted into the top of an underground electrical vault. The base and the depending wall have shapes which enable them to fit respectively into the tops of the two most common sizes of underground vaults. The pedestal includes provisions for a telephone as well as a compartment for storing project-related plans and papers. In one embodiment, the pedestal includes two independent electrical power meters so that the same pedestal and underground vault can service two adjacent construction projects simultaneously.

4 Claims, 2 Drawing Sheets

TEMPORARY ELECTRICAL POWER PEDESTAL

BACKGROUND OF THE INVENTION

1. Field of the Invention

The present invention is in the field of electrical equipment and specifically relates to an enclosure for mounting an electric power meter and a circuit breaker box for temporarily supplying electrical power to a construction site.

2. The Prior Art

One of the earliest improvements to be made to a construction site is for the utility company to bring electrical power to the site by extending buried electrical cables to the site, and terminating these cables in an underground concrete or plastic vault.

When he needs electrical power, the developer typically purchases and erects a large wooden pole near the vault. The electrical power meter and circuit breaker box are then mounted on the wooden pole and the utility company connects them to the electrical cable in the vault. Thereafter, metered electrical power is available to the developer for use in constructing a building.

After the building has been completed and has passed final inspection, the circuit breaker box in the building is used. The temporary power pedestal is no longer needed, so it is disconnected and removed. Thus, the power pedestal of the present invention replaces the temporary wooden pole previously used and improves on it in several significant ways as will be described below.

Although several power pedestals are known in the art, the present invention includes features which distinguish it from existing pedestals.

In U.S. Pat. No. 4,519,657, issued May 28, 1985 to Jensen, there is described a permanent multiple service unit that includes water, telephone and other service equipment as well as a lamp at the top of the unit. The unit is intended to be secured in place by frangible bolts. A separate base serves as an adapter to permit the pedestal to be bolted to a permanent cast concrete foundation.

In U.S. Pat. No. 3,800,063, issued Mar. 26, 1974 to Di Maggio, et al., there is shown an electrical service pedestal that includes a meter and circuit breaker panel for supplying electrical current to a traffic signal. The bottom base plate has a plurality of holes for securing the pedestal to a concrete foundation, to which it remains permanently attached.

In U.S. Pat. No. 4,307,436, issued Dec. 22, 1981 to Eckart, et al., there is described a power distribution center for use at marinas, trailer camps and the like. There is no provision for metering the power, and it appears that the unit includes a base that is screwed to a wooden platform or similar structure.

In U.S. Pat. No. 3,872,234, issued Mar. 18, 1975, Smith describes a pedestal enclosure for an aboveground cable splice which is designed to prevent sunlight from reaching the insulation of the cables. The device lacks an electric meter and no receptacles are provided.

In U.S. Pat. No. 3,868,474, issued Feb. 25, 1975 to Bunten, there is described a terminal enclosure for electrical wires, which typically are used by telephone companies. The enclosure is provided with an extension for the purpose of increasing its height.

As will be seen in greater deal below, the above-described inventions lack certain features which render the pedestal of the present invention extremely useful.

SUMMARY OF THE INVENTION

It is a objective of the present invention to provide an electrical power pedestal that is temporary, and therefore is easy to install and to remove.

It is a further objective of the present invention to provide a temporary power pedestal that is versatile, in that the same pedestal can be used with the most common sizes of underground vaults and in that, in one embodiment, the pedestal can provide electrical service to two adjacent but independent projects.

It is a further objective of the present invention to provide a temporary electrical power pedestal that is convenient to use in that the pedestal includes a compartment in which a telephone or plans may be stored.

It is a further objective of the present invention to provide a temporary electrical power pedestal that is attractive in appearance and economical to manufacture.

All of these objectives are met by the temporary electrical power pedestal of the present invention. Two embodiments are included. The first embodiment is intended for us at a single construction site where only a single electrical power meter is necessary. The second embodiment includes two electrical power meters and two sets of circuit breakers and receptacles so that the second embodiment can be used at two adjacent but independent construction projects, such as might be found when a tract is being developed.

Two sizes of underground vaults are in common use. The structure of the base of the pedestal of the present invention enables it to be used with either size vault and without the necessity for using an adapter.

In recognition of the fact that a telephone is a practical necessity at a construction site, the pedestal of the present invention includes provision for a telephone line and a compartment that the user can secure for storing a telephone instrument. Construction plans and building permits can also be stored in the same compartment.

The pedestal of the present invention is molded as a unitary plastic shell by a centrifugal molding process. This assures that the pedestal will be strong as well as economical to manufacture. A further benefit of this type of construction is that the pedestal is weather-tight and never needs to be painted. Pleasant colors can be imparted to the plastic, and the matte surface of the plastic is easy to maintain in an attractive clean condition.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

DETAILED DESCRIPTION OF THE PREFERRED EMBODIMENTS

Figure 1:
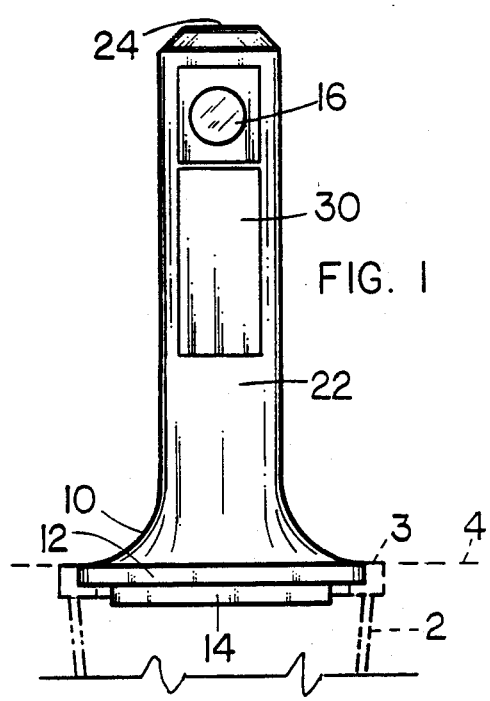
FIG. 1 is a front elevational view of a first preferred embodiment of the temporary electrical power pedestal of the present invention.
Figure 2:
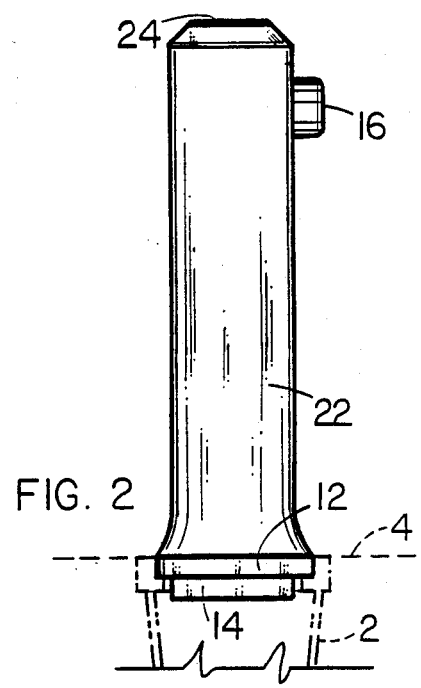
FIG. 2 is a right side elevational view of the pedestal of FIG. 1.
Figure 3:
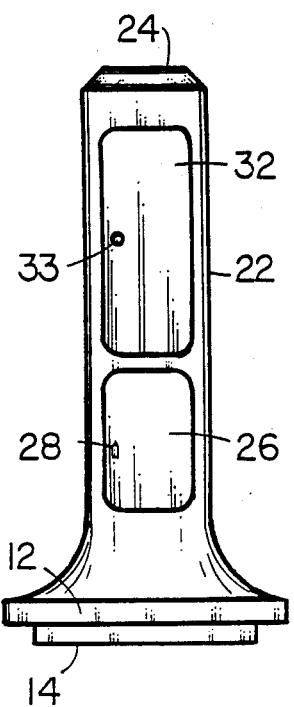
FIG. 3 is a rear elevational view thereof.
Figure 4:
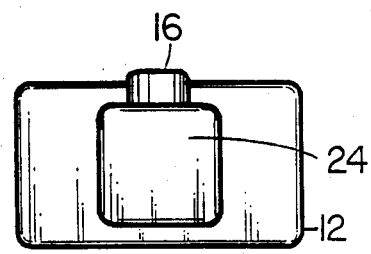
FIG. 4 is a top plan view thereof.
Figure 5:
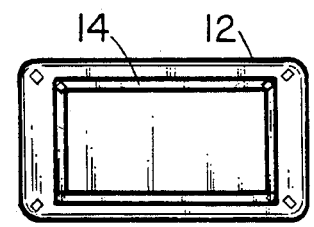
FIG. 5 is a bottom plan view thereof.
Figure 6:
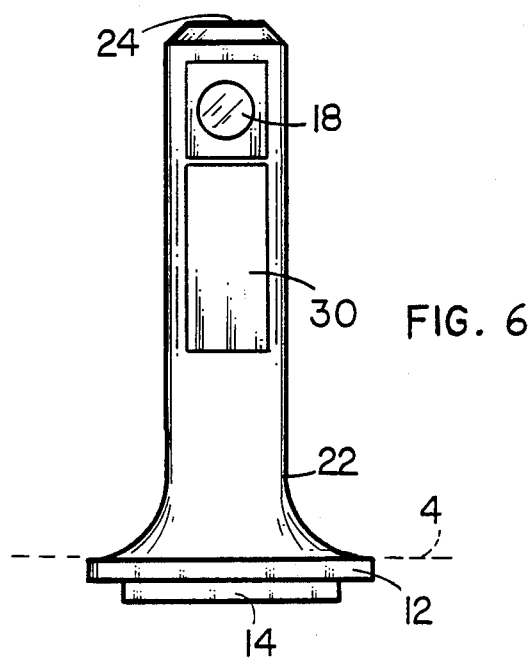
FIG. 6 is a front elevational view of a second preferred embodiment of the temporary electrical power pedestal of the present invention.
Figure 7:
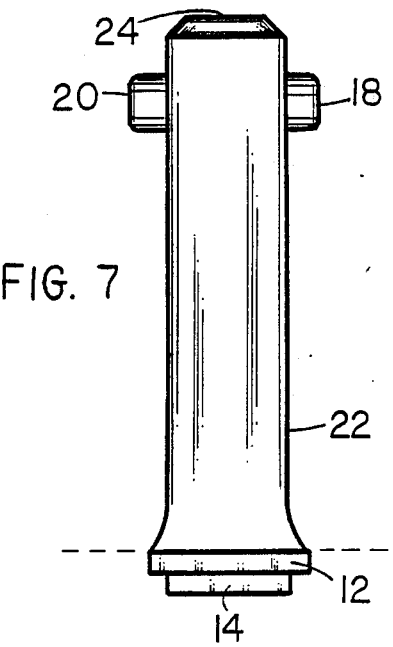
FIG. 7 is a right side elevational view thereof.
Figure 8:
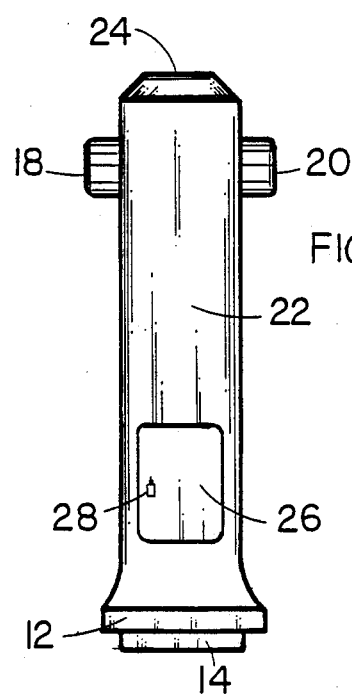
FIG. 8 is a left side elevational view thereof.
Figure 9:
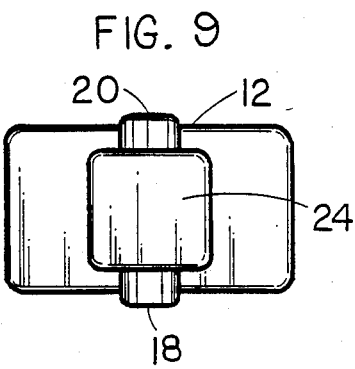
FIG. 9 is a top plan view thereof.
Figure 11:
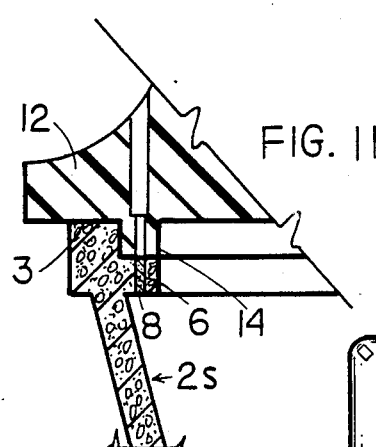
FIG. 11 is a fractional side elevational view in cross-section showing how the base of the pedestal fits into a smaller underground vault; and, FIG. 12 is a fractional side elevational view in cross-section showing how the base of the pedestal fits into a larger underground vault.
Figure 12:
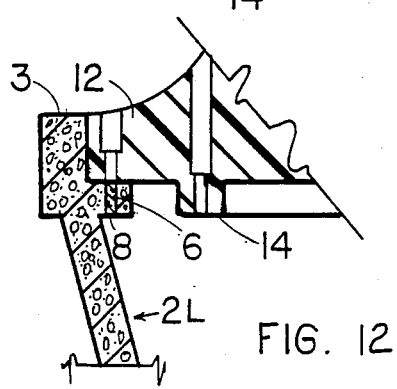
Figure 10:
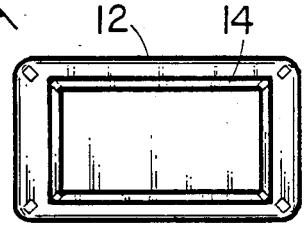
FIG. 10 is a bottom plan view thereof.

The pedestal of the present invention is designed to sit over an existing underground vault to which a utility company has extended conductors for carrying electricity. The top 3 of the vault 2 is at ground level 4. As best seen in FIGS. 11 and 12, the vault 2 includes an internal ledge 6 that is recessed from the top 3 for the purpose of supporting a lid (not shown). The internal ledge 6 includes a threaded hole 8 into which bolts are screwed to secure the lid to the vault.

Two sizes of vaults are in common use. The lid of the first size measures 13 inches by 24 inches, and the lid of the second size vault measures 17 inches by 30 inches.

The base 12 of the pedestal 10 has a size and shape that permits it to fit into the top of the larger vault 2L of FIG. 12. In accordance with the present invention, a wall 14 extends downward from the base 12 and is of such size and shape as to permit it to fit into the top of the smaller vault 2S, as shown in FIG. 11.

The same base 12 and wall 14 are used in both the embodiment of FIGS. 1–5 and in the embodiment of FIGS. 6–10. FIGS. 11 and 12 are common to both embodiments.

The two embodiments differ mainly in that the embodiment of FIGS. 1–5 has only one electric power meter 16, while the embodiment of FIGS. 6–10 has two electric power meters 18 and 20.

In both embodiments, a square column 22 extends upward from the base 12 and is closed at its top 24.

In both preferred embodiments, the column 22, the base 12 and the wall 14 are a unitary article, and the column 22 is hollow. In the preferred embodiments, the pedestal is molded of a suitable plastic by a centrifugal molding process.

About a third of the way up the column 22, a horizontal partition spans the space within the column, dividing the space into a lower chamber and an upper chamber. Access to the lower chamber is through the door 26, and such access is limited to the utility company. The door 26 is secured by the lock 28. It is in this lower chamber that the utility company employee establishes the electrical connection that energizes the electric power meter and the receptacles used by the customer. The customer has access to the circuit breakers and receptacles through the panel 30.

In the embodiment of FIGS. 1–5, the remainder of the upper chamber of the column 22 serves as a storage compartment which the user has access to through the door 32 at the rear of the pedestal. The partition that separates the upper chamber from the lower chamber serves as the bottom of the upper compartment. A telephone jack is provided in the partition so that a telephone may be stored in the upper compartment. This compartment may also be used to store blueprints, inspection papers, and other items in addition to the telephone. The storage compartment can be secured by a lock 33 on the door 32.

In the embodiment of FIGS. 6–10, most of the space within the upper compartment is taken up by the meter panel, and the circuit breakers and receptacles; there is not enough room remaining to provide a storage compartment. The telephone line and an armour clad copper wire that leads to a ground rod are brought out through small holes in the pedestal near the base.

Although the pedestal of the present invention is particularly well adapted for use with an underground vault, the pedestal can also be used where a vault has not been provided. In that case, the pedestal is secured to the ground through the use of four 24 inch or 36 inch anchor rods. A 3 inch sand base is provided between the pedestal and the ground to facilitate leveling of the base.

Thus, there has been described a temporary electrical power pedestal that is quickly and easily installed and removed from a construction site. The pedestal is quite versatile in that it can be attached to underground vaults of various sizes, and in one embodiment, the pedestal can serve two adjacent projects at the same time. The pedestal includes convenience features such as a storage compartment for a telephone and for storing plans and other items relating to the project. The pedestal is economical to manufacture and has a neat clean appearance.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. A temporary power pedestal that can be removably affixed to the open upper end of an underground utility vault so as to sit on the vault in place of the lid otherwise used to cover the vault, said temporary power pedestal capable of fitting both the larger and the smaller of the two most commonly used sizes of vaults and comprising:

a hollow-unitary body including a base and a column melding into said base and extending upwardly from said base;

said base having a size and shape that permits it to fit the open upper end of the larger of the two most commonly used sizes of vaults;

said base further including a downwardly-extending wall having a size and shape that permits it to fit the open upper end of the smaller of the two most commonly used sizes of vaults.

2. The temporary power pedestal of claim 1 wherein said column includes separate upper and lower compartments, and further includes means for independently securing said upper and lower compartments against unauthorized entry.

3. The temporary power pedestal of claim 1 wherein the larger underground utility vault includes an internal ledge, and wherein said base has a size and shape that allows it to fit into the vault and to rest on the internal ledge.

4. The temporary power pedestal of claim 1 wherein the smaller underground utility vault includes an internal ledge, and wherein said wall has a size and shape that allows it to fit into the vault and to rest on the internal ledge.

* * * * *